Patented Jan. 12, 1954

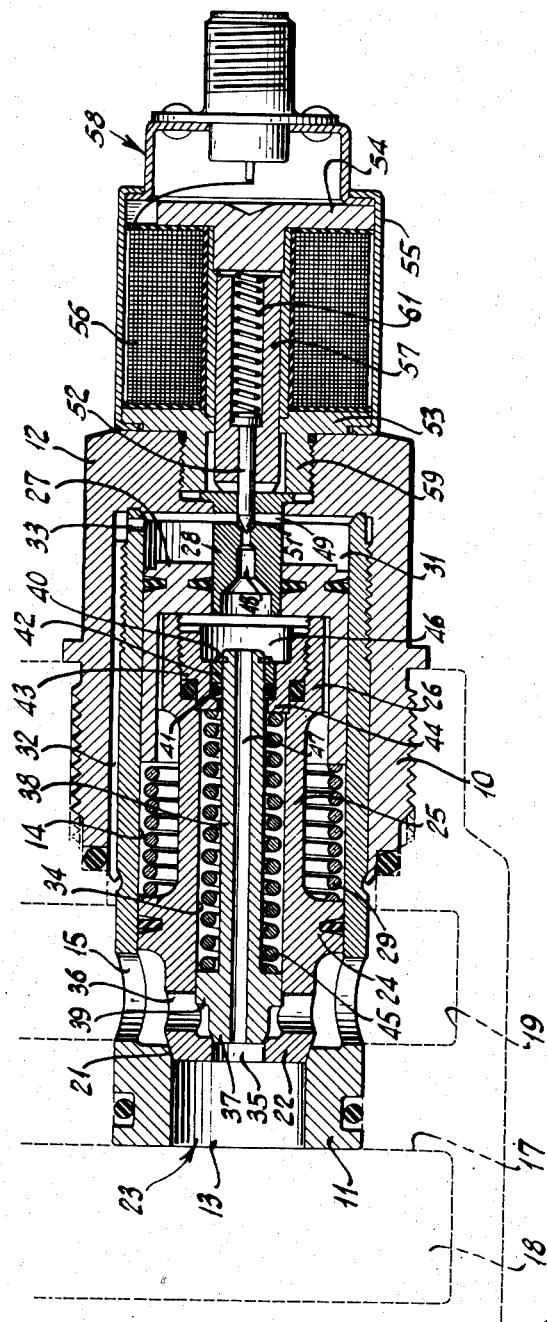

2,665,708

UNITED STATES PATENT OFFICE 2,665,708

PRESSURE FLUID OPERATED BY-PASS AND RELIEF VALVE

Edwin I. Ghormley, Dayton, Ohio, assignor to United Aircraft Products, Inc., Dayton, Ohio, a corporation of Ohio Application October 19, 1949, Serial No. 122,313

12 Claims. (Cl. 137—493)

This invention relates to pressure fluid operated valves, particularly of the electromagnetically controlled class.

Valves of the class described have a number of uses in pressure fluid distributing systems, for example in fuel systems of aircraft where they may function as selectively operable by-pass control devices or the like. In its general function and mode of operation the instant valve is similar to those disclosed in prior applications by the same inventor, including S. N. 71,899, filed January 21, 1949, for Electromagnetically Controlled Valve.

A broad object of the present invention is to improve upon the valve of the prior mentioned application in regard to features of simplicity and ease of operation.

Another object of the invention is to incorporate in a valve of the kind described an automatic pressure relief ability whereby excessive system pressures may be relieved in the closed position of the valve.

A further object of the invention is to enable the pressure relief mechanism to operate irrespective of the direction of applied pressure.

Other objects and structural details of the invention will appear from the following description when read in connection with the accompanying drawing, which is a view in longitudinal section through the valve.

Referring to the drawing, the valve comprises first and second cylindrical body members 10 and 11. Body member 10 is open at its inner or left hand end and is closed at its opposite end by integral wall 12. Body member 11 is arranged in inner telescoping relation to the body 10 and is screwed into the outer member in such wise as to make an integral structure of the bodies. One end of the body 11 abuts wall 12, within body 10, while the other end thereof projects through and beyond the open end of body 10. A central longitudinal bore in the body 11 defines a port or opening 13 in the projecting end thereof while a counterbore 14 provides for reception in the body 11 of control parts to be described. A set of radial ports 15 in the body 11 open into the counterbore 14 adjacent the longitudinal port 13.

The body member 10 is externally threaded so that the assembly of which it is a part may be installed in a pressure fluid manifold or housing, such as that indicated by broken lines in the drawing and marked 16. When so installed, the projecting end of body 11 lies within a vertical wall 17 of the housing 16, the longitudinal port 18 serving to interconnect chambers 18 and 19 on opposite sides of the wall 17. Radial ports 15 register with chamber 19 so that fluid may reach chamber 18 from chamber 19 by passing through ports 15 into the counterbore 14 and out port 13. The instant valve is constructed and arranged, primarily, to control the flow of fluid from chamber 19 to chamber 18 so for purposes of the present description chamber 19 will be considered to be an area of high pressure and chamber 18 an area of low pressure. Fluid at high pressure is ordinarily present at radial ports 15, therefore while relatively small or no pressure is present at port 13.

The junction of counterbore 14 with the bore defining port 13 provides an annular valve seat 21 surrounding the port 13. Adapted to engage the seat 21 is a valve 22 forming part of a tubular piston valve assembly 23 slidably mounted in counterbore 14. The assembly 23 further comprises an annular shoulder 24 in sealed sliding contact with the wall of counterbore 14, and a rearwardly or rightwardly extending stem portion 25 terminating in a skirt 26. The skirt 26 is received in and has a sliding bearing in a piston 27 presenting a vertical base wall against which the skirt 26 normally abuts. The piston 27 is in sealed sliding contact with the wall of counterbore 14 and has a central opening in sealed sliding contact with a stub shaft 28 mounted in wall 12 of body member 10. A compression spring 29 is interposed between shoulder 24 and piston 27 and tends to separate piston assembly 23 and piston 27. The illustrated relationship between the parts is normally maintained, however, by pressure fluid admitted to a chamber 31 defined between piston 27 and end wall 12. The chamber 31 communicates with chamber 19 or radial ports 15 by a passage 32 formed between the body elements 10 and 11 and an orifice 33 connecting passage 32 to chamber 31. The pressure exerted upon piston 27 in chamber 31 and the pressure exerted upon shoulder 24 by reason of its location adjacent ports 15 are opposed. Piston 27 presents the greater area upon which the pressure fluid may act, however, so that the opposing pressures are unbalanced, with the greater pressure being exerted in a direction to move piston 27 and piston assembly 23 leftward or in a direction to engage valve 22 upon seat 21. Communication between the radial ports 15 and longitudinal port 13 thus is normally cut off as long as pressure is supplied ports 15.

Piston assembly 23 presents an internal bore 34 communicating with port 13 by way of a central opening 35 and with radial ports 15 by way of a radial opening 36. Mounted within the bore 34 is a pressure relief valve assembly including a valve head 37 arranged to seat in and close a opening 35, and a rearwardly extending stem or shaft 38 of relatively smaller diameter than head 37. A fluted flange 39 provides a bearing for the head 37 in bore 34 and permits pressure fluid entering opening 36 to flow rearwardly in the bore to fill the space between stem 38 and the wall of the bore. That end of the bore 34 opposite opening 35 is closed by a seal-bearing assembly comprising an O ring 41 surrounding the stem 38 and backed up by a ring 42 held in place by a spring clip 40. The outer surfaces of the O ring 41 and ring 42 are in contact with a sleeve 43 screw threaded into the skirt 26 of the piston valve assembly 23. An inturned flange 44 on the inner end of sleeve 43 assists in confining sealing ring 41 and further provides a base for a compression spring 45, the other end of which engages valve head 37 and urges it to a closed position within opening 35. The flange 44 is spaced slightly from valve stem 38 and permits access of fluid pressure to the sealing ring 41 from bore 34, such pressure acting upon the ring and its back-up ring 42 in a direction to withdraw valve head 37 from its seat in opening 35.

The sleeve 43 and its surrounding skirt 26 define, in conjunction with piston 27, a chamber 46. Such chamber is continuously connected to low pressure port 13 by a through bore 47 in valve head 37 and stem 38. The chamber 46 further may communicate with pressure chamber 31 through stub shaft 28 there being interacting longitudinal and transverse bores 48 and 49 in the stub shaft. At the point of intersection of the bores 48 and 49 there is formed a valve seat 51. A needle valve 52 enters longitudinal bore 48 from the front of the stub shaft, and, when held against seat 51 effectively denies communication between the chambers 31 and 46. The needle valve 52 is a part of an electromagnet assembly which further includes end plates 53 and 54, casing 55, coil 56, plunger 57, and connector unit 58. The needle valve 52 is carried by plunger 57 for positive retraction therewith, the plunger having a bearing in a boss 59 on end plate 53 and screwed into the wall 12 of body 10. A spring 61 urges plunger 57 outwardly of the electromagnet, in a direction to engage needle valve 52 in seat 51. Energizing of the coil 56 retracts plunger 57 to unseat needle valve 52 and open communication between chamber 31 and chamber 46.

The valve is illustrated with the ports shown in the position they assume when the coil 56 is deenergized and when fluid under pressure is supplied radial ports 15. The pressure at ports 15 is communicated through passage 32, and orifice 33 to chamber 31 where it exerts a force to the left against piston 27. By reason of the abutment of piston 27 with skirt 26 of the piston valve assembly, valve 22 is pressed against seat 21 so that the passage of fluid from ports 15 to port 13 is prevented. When there is no pressure supplied ports 15, the spring 29 will react between shoulder 24 and piston 27 to maintain valve 22 seated. Piston 27 may or may not move to the right and bottom against wall 12 of body 10.

When the solenoid core 56 is energized, plunger 57 is pulled to the right, lifting needle valve 52 from its seat 51 in stub shaft 28. This allows fluid to flow from chamber 31 through bores 48 and 49 into chamber 46 and thence by way of passage 47 to port 13 and the area of low pressure. Since orifice 33 is relatively smaller in area than bores 48 and 49, the pressure maintained in chamber 31 is reduced from that at the ports 15. A condition of pressure unbalance toward the right accordingly results, so that valve 22 is lifted from seat 21, opening flow between ports 15 and port 13. A slotted or similar configuration of the face of piston 27 will avoid restriction of the flow from chamber 31 when the piston has moved to the right and abuts body wall 12.

When the solenoid coil 56 is again deenergized, the spring 61 will return plunger 57 and needle valve 52 to their original positions. The pressure in chamber 31 will accordingly rise. In response thereto the piston 27 will move outward, and, in the course of such motion return valve 22 to its place on seat 21.

The function of the pressure relief valve 37 is to limit the pressure at ports 15, or, more particularly, the pressure difference between ports 15 and port 13. Pressure is transmitted from ports 15 through openings 36 in the piston valve assembly to bore 34. Escape of the fluid through opening 35 is prevented by the seal effected through the seating of valve 37 in the opening 35. Escape of the fluid from the opposite end of the bore is prevented by O ring seal 41 and another seal between sleeve 43 and skirt 26. By a suitable relationship between the area of seal 41, against which the pressure in bore 34 is applied, and the area of opening 35 the valve 37 is caused to relieve against the force of spring 45. In this instance the pressure transmitted from the ports 15 acts upon the annular area of seal 41 backed up by ring 42 and exerts a force to the right tending to lift valve 37 from its seat in opening 35. When fluid pressure force overbalances the opposing force of spring 45 valve 37 will open and allow fluid to pass from ports 15 through ports 36 and out opening 35 to port 13.

While the function may have no utility in the illustrative installation, the relief valve 37 can also be opened by pressure applied through port 13. By reason of the longitudinal passage 47 in the relief valve and its stem, the pressure existing at port 13 also prevails in chamber 46. The stem 38 of valve 37 projects into chamber 46 and presents an annular end area for action thereon of the fluid pressure within the chamber. This area, however, is substantially less than the area of valve 37 presented to port 13 so that when the pressure difference between port 13 and ports 15 reaches a sufficiently high value, the resultant force urging valve 37 to open position will overcome the opposition of spring 45. Utilizing a known physical embodiment of the valve by way of illustration, with a pressure difference existing from the port 13 to the ports 15, a differential of approximately 475 p. s. i. is required to open relief valve 37. Where the pressures are reversed, that is a higher pressure at ports 15 than at port 13 a differential of about 1250 p. s. i. is required to open the relief valve.

In connection with the reversibility feature of the relief valve 37, it will be understood that the sealing assembly comprising O-seal 41, back-up ring 42 and lock washer has a prominent part in the pressure relief operation. With high pressure at ports 15, seal 41 is urged against back-up ring 42 which in turn limits against washer 40. Accordingly, the seal 41 provides an area against which the pressure fluid may react and so urge the valve 37 on to an unseated position. In the reverse condition, that is with high pressure at port 13, the corresponding static pressure in chamber 46 is applied around the back-up ring 42 to the O-seal 41 which is urged thereby to a seat on the relatively fixed flange 44. In this circumstance, therefore, the fluid pressure in chamber 46 is effective only over the actual diameter of the stem 38 which is somewhat less than the diameter of valve 37.

What is claimed is:

1. A pressure fluid operated valve, comprising a body presenting a longitudinal bore, a coaxial port at one end of said bore and a lateral port opening into said bore adjacent said one end thereof, a hollow piston valve slidable in said bore and arranged to seat in said coaxial port to close communication thereof with said lateral port, means for applying an unbalanced fluid pressure to said piston valve in a manner to seat said valve selectively operable means for unbalancing the fluid pressures acting on said piston valve in a manner to unseat said valve, and pressure relief means received in said hollow piston valve for establishing communication between said ports through said piston valve in response to the attainment of a predetermined pressure differential therebetween independently of said selectively operable means.

2. A pressure fluid operated valve according to claim 1, characterized in that said last named means is operative irrespective of the direction of the resultant pressure of said pressure differential.

3. A pressure fluid operated valve according to claim 2, characterized in that said operation of pressure relief means will occur at a lesser pressure differential when the greater pressure exists at said coaxial port than when the greater pressure is at said lateral port.

4. A pressure fluid operated valve, comprising a body presenting a port for the passage of fluid under pressure, a hollow valve for said port, pressure fluid operated means for controlling the opening and closing movements of said valve, a passage through said valve, an auxiliary valve received in said hollow valve controlling flow through said passage, means for maintaining said valve normally closed, and a construction and mounting for said auxiliary valve enabling opening thereof in response to pressure differential irrespective of on which side of said port the higher pressure prevails.

5. A pressure fluid operated valve, comprising a body presenting a port for the passage of fluid under pressure, a hollow piston type valve slidably mounted in said body on one side of said port and arranged to seat in said port, pressure fluid means for seating and unseating said valve to deny and permit the flow of pressure fluid through said port, a pressure relief passage through said piston valve, an auxiliary valve movable within said piston valve to open and close said passage, yielding means tending to maintain said auxiliary valve normally closed, said auxiliary valve presenting a surface area exposed to fluid pressure on one side of said port whereby a predetermined higher pressure on said one side of the port is effective to open said auxiliary valve, and said auxiliary valve presenting another surface area exposed to fluid pressure on the opposite side of said port whereby a predetermined higher pressure on said opposite side of the port is effective to open said auxiliary valve.

6. A pressure fluid operated valve, comprising a cylindrical body presenting at one end thereof a longitudinal port and a radial port adjacent said one end, the normal path of fluid flow through said body being in through said radial port and out through said longitudinal port, a hollow piston valve in said cylinder presenting an annular shoulder in sliding contact with the wall of the cylinder and a closed end portion to seat in said longitudinal port, pressure fluid means for shifting said piston valve within said cylinder to open and close said longitudinal port, a pressure relief passage through said piston valve including a first opening in the closed end thereof and a radial opening adjacent said closed end, a pressure relief valve arranged for reciprocable movement within said piston valve and presenting a head portion to seat in said first opening in said piston valve and a rearwardly extending stem portion, seal-bearing means mounted on said stem portion and in sliding contact with the surrounding wall of said piston valve, said seal-bearing presenting a surface area to which pressure fluid admitted through said second opening in said piston valve is applied in a direction to unseat the head portion of said reciprocable valve, and yielding means urging said pressure relief valve in a direction to seat said valve.

7. A pressure fluid operated valve, comprising a cylindrical body presenting a longitudinal port at one end thereof and a radial port adjacent said one end, the normal path of fluid flow being into the body by way of said radial port and out of the body by way of said longitudinal port, closure means for the opposite end of said body, a piston slidably mounted in said body and defining with said closure a pressure chamber at said opposite end of the body, a passage communicating said radial port with said pressure chamber whereby said piston tends to be moved by fluid pressure toward said longitudinal port, a piston valve slidably mounted in said cylinder in advance of said piston and arranged to seat in and close said longitudinal port, said piston valve abutting said piston and being urged thereby to seated position, an annular shoulder on said piston valve one side of which is exposed to pressure fluid entering said body from said radial port whereby said piston valve is urged in an unseating direction, the area of said one side of said annular shoulder being less than the area of said piston whereby said piston valve is normally held seated, a compression spring interposed between the other side of said annular shoulder and said piston urging a separating movement of said piston and piston valve, a longitudinal passage through said piston and said piston valve for exhausting said pressure chamber, and means for alternatively opening and closing said longitudinal passage.

8. A pressure fluid operated valve according to claim 7, characterized in that said longitudinal passage is in part formed in a pressure relief valve mounted in said piston valve to establish communication between said longitudinal port and said radial port in response to the attainment of a predetermined pressure differential therebetween.

9. An electromagnetically controlled pressure fluid operated valve, comprising a cylindrical body presenting at one end thereof a longitudinal port and adjacent thereto a radial port, fluid under pressure being supplied said radial port and tending to flow through said body to said longitudinal port, a first piston reciprocable in said cylinder and exposed to the pressure fluid entering said radial port to be urged thereby toward the opposite end of said body or away from said longitudinal port, a valve forming a part of said first piston and moved thereby to seated and unseated positions with respect to said longitudinal port, a closure for the said opposite end of said cylinder, a second piston reciprocable within said cylinder and defining with said closure and with said first piston first and second pressure chambers respectively, the effective area of said second piston exposed to pressure in said first chamber exceeding the area of said first piston exposed to pressure at said radial port whereby said second piston may act to engage and move said first piston to seat said valve in said longitudinal port, means communicating said first pressure chamber with said radial port, means communicating said second pressure chamber with said longitudinal port, and electromagnetically operable means for selectively communicating said first pressure chamber with said second pressure chamber.

10. An electromagnetically controlled pressure fluid operated valve according to claim 9, characterized in that said means connecting said second pressure chamber to said longitudinal port includes, a longitudinal bore in said first piston opening through said valve, a pressure relief valve mounted in said bore to close communication thereof with said longitudinal port, and a continuously open passage through said valve between said second pressure chamber and said longitudinal port.

11. An electromagnetically controlled pressure fluid operated valve according to claim 10, characterized by a radial opening in said first piston communicating the bore therein with said radial port, a seal-bearing mounted on said pressure relief valve and exposed to fluid pressure entering said opening to move said pressure relief valve to open position, and a spring maintaining said pressure relief valve normally closed.

12. A by-pass and pressure relief valve, including a hollow body presenting an axial opening at one end thereof, means for supplying pressure fluid to said hollow body, hollow piston valve means slidable in said body to close said opening and to define in the opposite end of said body a pressure chamber, one end of said piston valve means having an axial port registering with said axial opening in said body, radial port means in said piston valve means, a pressure relief valve longitudinally disposed in said piston valve means and comprising a head portion normally closing said axial port and a smaller diameter stem portion extending toward said pressure chamber, said relief valve having a through bore continuously communicating said axial body opening with said pressure chamber, a seal bearing assembly in surrounding relation to the stem of said relief valve and including an O-ring seal exposed on one side to the pressure of fluid at said radial port means and exposed on the other side to the pressure of fluid in said pressure chamber, a relatively fixed seat to which said O-ring seal is urged by pressure fluid from said pressure chamber, and an abutment on said stem portion to which said O-ring seal is urged by pressure fluid from said radial port means.

EDWIN I. GHORMLEY.

References Cited in the file of this patent

UNITED STATES PATENTS

| Number | Name | Date |
| --- | --- | --- |
| 2,268,227 | Rose | Dec. 30, 1941 |
| 2,285,323 | Beekley | June 2, 1942 |
| 2,329,001 | Robinson | Sept. 7, 1943 |
| 2,345,306 | Van Der Werff | Mar. 28, 1944 |
| 2,353,577 | Magrum | July 11, 1944 |
| 2,479,359 | Holt | Aug. 16, 1949 |